XR 3,848,250

United States

Kashio

[11] 3,848,250

[45] Nov. 12, 1974

[54] OPTICAL CHARACTER-DISPLAYING APPARATUS USING LIQUID CRYSTALS

[75] Inventor: Toshio Kashio, Tokyo, Japan

[73] Assignee: Casio Computer Co., Ltd., Tokyo, Japan

[22] Filed: Aug. 20, 1973

[21] Appl. No.: 390,179

[30] Foreign Application Priority Data

Aug. 25, 1972 Japan ............................... 47-85079

[52] U.S. Cl........ 340/336, 235/92 EA, 350/160 LC

[51] Int. Cl. ............................................ G08b 5/36

[58] Field of Search ....................... 340/336, 324 M; 350/160 LC; 235/92 EA

[56] References Cited

UNITED STATES PATENTS

| | | | |
|---|---|---|---|
| 3,581,065 | 5/1971 | Hatsukano et al. | 235/92 EA |
| 3,614,769 | 10/1971 | Coleman et al. | 340/324 M |
| 3,646,544 | 2/1972 | Yamaguchi | 340/324 R |
| 3,653,745 | 4/1972 | Mao | 350/160 LC |
| 3,731,986 | 5/1973 | Fergason | 350/160 LC |
| 3,740,717 | 6/1973 | Huener et al. | 340/166 EL |
| 3,750,139 | 7/1973 | Blishak | 340/336 |
| 3,760,406 | 9/1973 | Walton | 340/336 |
| 3,781,864 | 12/1973 | Fujita | 340/336 |
| 3,781,865 | 12/1973 | Yamazaki | 340/336 |

*Primary Examiner*—David L. Trafton
*Attorney, Agent, or Firm*—Flynn & Frishauf

[57] ABSTRACT

An optical character-displaying apparatus having a plurality of segmental liquid crystal electrodes acting as display elements so arranged as to present any desired character, wherein the plural segmental liquid crystal electrodes acting as display elements are connected to the corresponding bit sections of a memory device which are provided in the same number as the segmental liquid crystal electrodes. Numerical data being indicated on the display apparatus is previously stored in an entry register and then conducted therefrom through a logic circuit to the memory device. The memory device is subjected to shifting by clock pulses delivered by a timing pulse generator for each word time, thereby producing output signals from the bit sections corresponding to the stored numerical data for final presentation on the subject character-displaying apparatus. A potential is alternately impressed across a common electrode and the plural segmental liquid crystal electrodes acting as display elements by cooperation between an output signal delivered in a state inverted per determinate word by a flip-flop circuit connected to the common electrode and the inversion of signal polarity effected by an inverter connected between the input and output terminals of the memory device.

1 Claim, 2 Drawing Figures

3848250
OR IN 340/336

OPTICAL CHARACTER-DISPLAYING APPARATUS USING LIQUID CRYSTALS

BACKGROUND OF THE INVENTION

This invention relates to an optical character-displaying apparatus using liquid crystals wherein improvement is made on a means for impressing an alternating potential on the plural segmental liquid crystal display elements. With an optical character-displaying apparatus for various calculators, demand is made optically to display characters by means of electric signals and, particularly for a compact desk top calculator or computer to present numerals stored for arithmetic operation and the result of said arithmetic operation quickly in the form of digits. To this end, the prior art process consisted in arranging a plurality of, for example, segmental optical display elements in the prescribed pattern and impressing a voltage signal for illumination only on those of said segmental optical display elements which are to be used in optically displaying a character. In this case, impression of such voltage consumes a relatively large amount of power, causing a battery used as a power source with a compact desk top calculator or computer to be prominently depleted, leading to its short life. To eliminate the drawback of the prior art calculator of consuming a considerable amount of power, there has recently been developed a display element or liquid crystal, whose light permeability varies with the magnitude of voltage impressed thereon. When, however, supplied with voltage only acting in one direction, the liquid crystal is inferior to durability and decreases in its light permeability or display capacity, presenting difficulties in optically indicating distinct characters. Though, therefore, alternating current is considered as an indispensable source of driving power for compensating said durability, yet signals delivered from the arithmetic operation circuit or memory device of a desk top calculator or computer have a particular polarity, namely, a positive or negative polarity. Accordingly, any prior art process has failed effectively to operate an optical character-displaying apparatus using liquid crystals.

This invention has been accomplished in view of the above-mentioned circumstances and is intended to provide an optical character-displaying apparatus using liquid crystals which has been improved for effective application as the display device of a desk top calculator or computer by supplying segmental liquid crystal display elements with driving signals whose polarities are inverted in synchronization with a synchronizing signal of the computer.

SUMMARY OF THE INVENTION

To attain the above-mentioned object of this invention, a plurality of segmental liquid crystal electrodes acting as display elements which are connected to the corresponding bit positions of a memory device have their potentials controlled by the signal polarity-inverting action of an inverter connected between the input and output terminals of the memory device. On the other hand, a common electrode to the plural segmental liquid crystal electrodes acting as display elements has its potential controlled by a switching signal generator in synchronization with a shift pulse delivered from a shift controlling means so as to effect shifting in the memory device, thereby impressing an alternating potential on the segmental liquid crystal display electrodes of the subject optical character-displaying apparatus using liquid crystals. Accordingly, this character-displaying apparatus is effectively applicable, for example, to a desk top calculator or a computer.

DETAILED DESCRIPTION OF THE INVENTION

There will now be described by reference to the appended drawings an optical character-displaying apparatus using liquid crystals embodying this invention.

Figure 1:
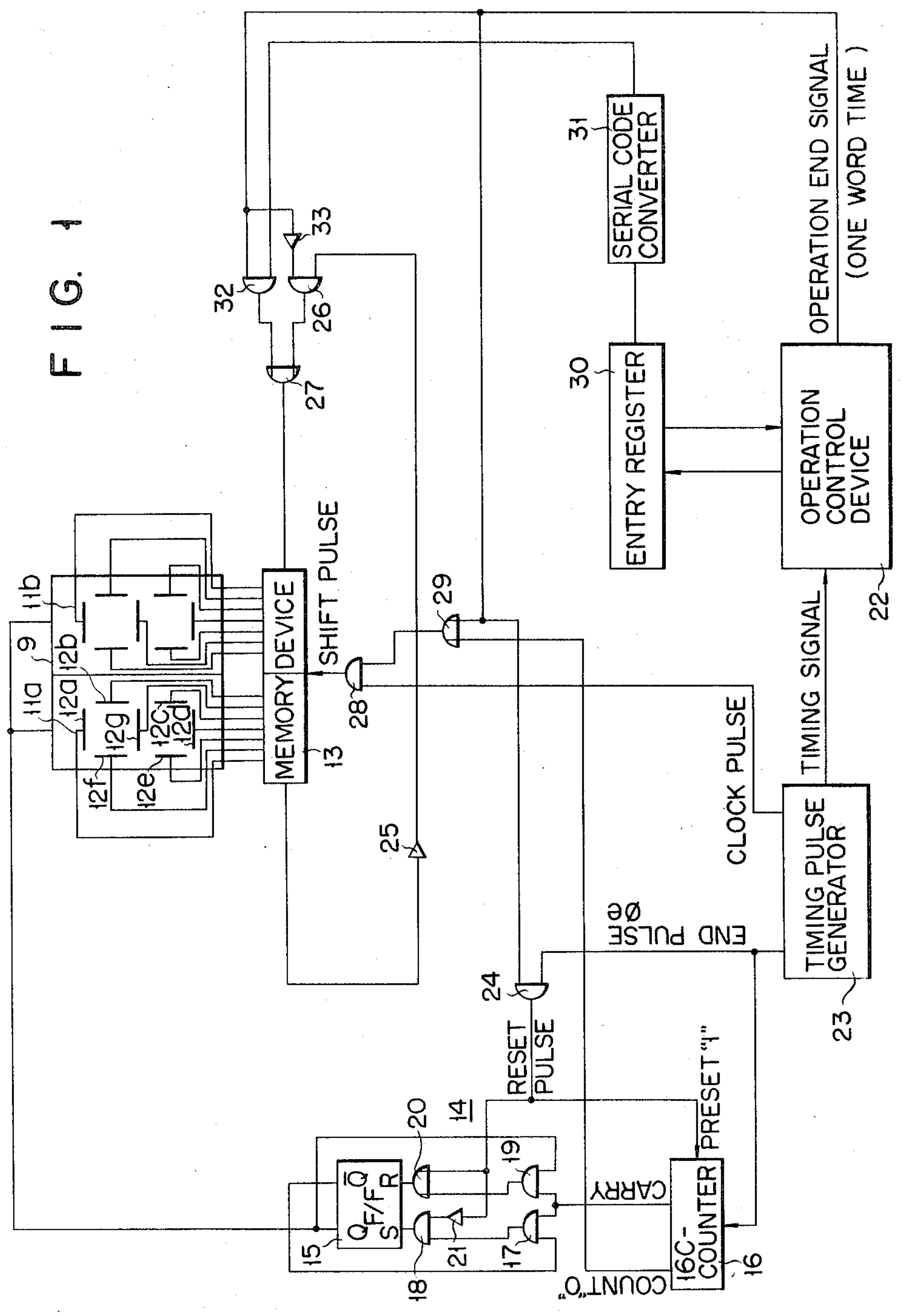
FIG. 1 is a block circuit diagram of an optical character-displaying apparatus using liquid crystals embodying this invention.

Referring to FIG. 1, referential numerals 11*a* and 11*b* denote display devices, each of which consists of, for example, seven segmental liquid crystal display elements 12*a* to 12*g* so arranged as to present the prescribed pattern. Selective operation of the segmental elements indicates any desired character or figure. For the display devices 11*a* and 11*b* is provided a memory device 13 consisting of, for example, a static shift register. The memory device 13 has two groups of seven bit sections, namely, 14 bits in all, half of which corresponds to one word, namely, the seven segmental elements of each of the display devices 11*a* and 11*b*. The bit signals from the memory device 13 are supplied to the corresponding segmental liquid crystal display elements of the display devices 11*a* and 11*b*. Further, there is provided a common electrode 9 to the two groups of seven segmental liquid crystal display elements 12*a* to 12*g* of the display devices 11*a* and 11*b*. The common electrode 9 which is supplied with bit signals from the two groups of seven segmental liquid crystal display elements 12*a* to 12*g* is connected to the set output terminal Q of a flip-flop circuit 15 acting as a switching signal generator. A carrier signal delivered from a counter 16, for example, of the 16-scale for every 16 counts is supplied to the set terminal S of the flip-flop circuit 15 through AND circuits 17 and 18. Said carrier signal is also conducted to the reset terminal R of the flip-flop circuit 15 through an AND circuit 19 and OR circuit 20. The AND circuits 17 and 19 are supplied with gate signals constituted by reset and set output signals from the flip-flop circuit 15 respectively. The AND circuit 18 is gated by an output signal from an AND circuit 24 which consists of an operation end signal delivered by an arithmetic operation controlling device 22 through an inverter 21 and an end pulse $\phi_e$ produced per word time by a timing signal generator 23. An output signal from the AND circuit 24 is further conducted to the OR circuit 20 and the preset terminal of the counter 16.

Between the input and output sides of the memory device 13 is provided a shift circuit consisting of an inverter 25, AND circuit 26 and OR circuit 27. The memory device 13 is supplied through an AND circuit 28 with a shift pulse consisting of a clock pulse delivered by a timing pulse generator 23. The AND circuit 28 is gated through an OR circuit 29 by a signal generated when the counter 16 counts zero as well as by an operation end signal which is supplied by the arithmetic operation controlling device 22. In this case, the counter 16 carries out counting upon receipt of an end pulse $\phi_e$ delivered by the timing pulse generator 23. A signal denoting a count 0 is generated per word time and an operation end signal is also produced per word time.

The arithmetic operation controlling device 22 is connected to an entry register 30. 4 bit numerical data associated with the display elements drawn out as seven bit serial signals from the entry register 30 through, for example, a 4–7 serial code converter 31 are conducted to the OR circuit 27 through an AND circuit 32. This AND circuit 32 is gated by the aforesaid operation end signal, which is also conducted as a gating signal to the AND circuit 26 through an inverter 33.

The optical character-displaying apparatus of this invention arranged as described above causes numerals stored in the entry register 30 to be indicated by the display devices 11*a* and 11*b*. Namely, the entry register 30 is stored with a numeral being supplied to the arithmetic operation controlling device 22 or a numeral required to indicate the result of said arithmetic operation. In this case, the entry register 30 memorizes operation numerals on the four-bit basis so as to facilitate said memory. The four bit signals constituting each numeral which is drawn out from the entry register 30 are converted by the serial bit converter 31 into seven bit signals corresponding to the seven segmental liquid crystal electrodes acting as display elements. This numerical data is stored in the memory device 13 having two groups of seven bit sections through the AND circuit 32 which is gated by a signal delivered per word time by the arithmetic operation controlling device 22 upon completion of arithmetic operation. To effect writing in the memory device 13, a gate signal is conducted to the AND circuit 32 and also to the AND circuit 28 through the OR circuit 29. The memory device 13 is supplied with clock pulses per word time so as to carry out shifting therein for writing. Namely, bit signals stored in the memory device 13 are supplied for display to the segmental liquid crystal display elements 12*a* to 12*g* of either or both of the display devices 11*a* and 11*b*. Said display is effected by an alternating potential difference prevailing between the memory bit sections of the memory device 13 and the common electrode 9.

Figure 2:
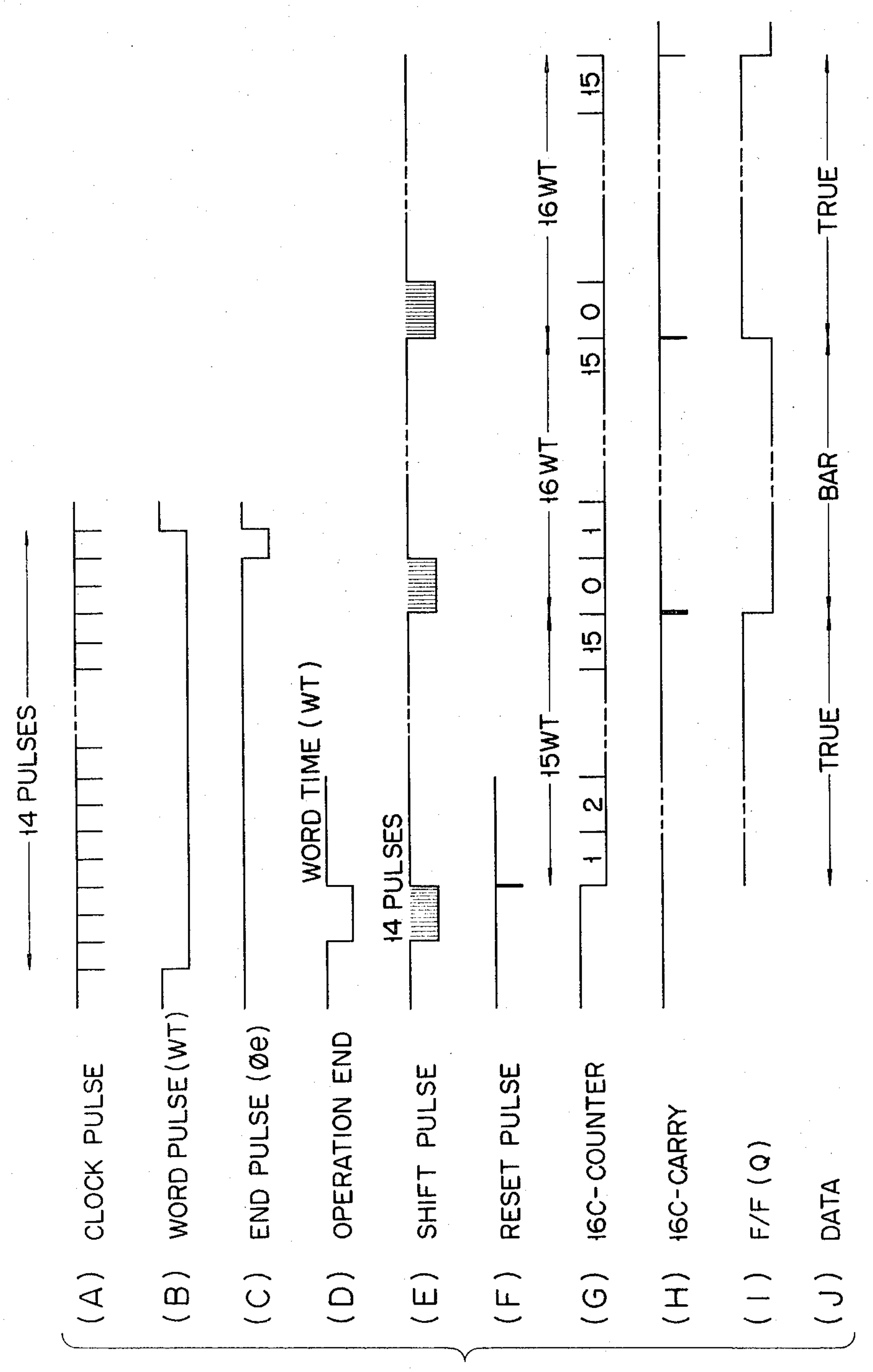
FIGS. 2A to 2J jointly constitute a timing chart illustrating the operation of the character-displaying apparatus of FIG. 1.

As previously described, the memory device 13 comprises two groups of seven bit sections. Accordingly, a word pulse of FIG. 2B is produced, each time the timing pulse generator 23 generates fourteen clock pulses of FIG. 2A. At the end of the word pulse is given forth an end pulse $\phi_e$ of Fig. 2C. Upon receipt of an operation end signal of FIG. 2D delivered per word time, the memory device 13 is supplied with a group of fourteen clock pulses of FIG. 2E, thereby enabling data of two digits to be stored in the two groups of seven bit sections. Since, at this time, the AND circuit 24 is supplied with an end pulse $\phi_e$, a reset pulse of FIG. 2F is conducted to the flip-flop circuit and counter 16 upon receipt of the aforesaid operation end signal so as to reset the flip-flop circuit 15 and make the counter 16 count 1. Namely, the common electrode 9 to the segmental liquid crystal display electrodes of the display devices 11*a* and 11*b* has a grounding potential, while the segmental liquid crystal display electrodes corresponding to the stored bits representing 1 in the memory device 13 present a potential different from that of the common electrode 9, thereby displaying a desired character.

Even after a character has been optically displayed, a timing pulse continues to generate pulse signals. Accordingly, an end pulse $\phi_e$ is delivered per word time, and the counter 16 carries out advanced counting, presenting counts shown in FIG. 2G. Where, in this case, the counter 16 is of the 16-scale type as a counter being cycling once in half suitable cycle time for driving alternatively the liquid crystals, a carrier of FIG. 2H is produced upon completion of counts "15". The carrier is supplied to gate the AND circuits 17 and 19. Since, at this time, the flip-flop circuit 15 is in a reset state, the AND circuit 17 generates an output signal which in turn is conducted to the AND circuit 18. Under this condition, an operation end signal is not given forth, causing the inverter 21 to generate an output signal of 1, and the flip-flop circuit 15 to be set. When the carrier is generated, the counter 16 counts 0 for one word time and delivers a gate signal to the AND circuit 28 for one word time through the OR circuit 29, giving rise to shifting in the memory device 13. Thus, the polarity of bit signals representing numerical data stored in the memory device 13 is inverted by the inverter 25 to be stored in said memory device 13 a second time, namely, the "True" state of the previously stored data is changed to the "Bar" state.

Under the condition where the bit signals stored in the memory device 13 present the "Bar" state the common electrode to the segmental liquid crystal display electrodes of the display devices 11*a* and 11*b* is impressed with a potential of [1] and the potential impressed on the respective segmental display electrodes indicates an inverted difference from that of the common electrode, causing a desired character to be displayed. The reason is that the flip-flop circuit 15 makes a reverse operation, each time a carrier signal is supplied thereto from the counter 16 and the polarity of bit signals representing numerical data stored in the memory device 13 is also reversed. Both types of reversion bear the relationship given in FIG. 2J.

The optical character-displaying apparatus of this invention causes the liquid crystals constituting the segmental display elements of the display device to be impressed with an alternating potential for a period corresponding to a count made by the counter 16, thereby attaining the optical display of characters by the liquid crystals under a stable condition.

The above-mentioned embodiment refers to the case where there was provided a memory device having as many bit sections as the sequential liquid crystal display elements constituting, for example, two digits being optically displayed, thereby controlling the display devices in a static state. However, this invention may be applied with the same effect to a dynamic optical display where a memory device is provided with as many bit sections as the sequential crystal display elements constituting more digits being optically displayed and any desired numeral which is to be optically displayed is selected by the signals generated from the corresponding bit sections of the memory device, together with the aid of the common electrode. Obviously, the arrangement of the segmental liquid crystal display elements may be varied as need arises.

What is claimed is:

1. An optical character-displaying apparatus using liquid crystals which comprises liquid crystal display devices each including a plurality of segmental liquid crystal display electrodes and a common electrode thereto; a memory device having as many bits as the segmental liquid crystal display electrodes of the display devices; an inverter connected between the input and output terminals of the memory device so as to invert the polarity of signals supplied to said inverter; a shift controlling device for supplying shift pulses to the memory device for the prescribed period in which the signals stored in the memory device have their polarity inverted by the inverter and then are shifted through the memory device; and switching signal generating means for changing the potential of the common electrode according to the inverted potential of the plural segmental liquid crystal display electrodes in synchronization with the shift pulse generated by the shift controlling device.

* * * * *